United States Patent [19]

Hansen et al.

[11] 4,043,789

[45] Aug. 23, 1977

[54] PROCESS FOR MANUFACTURING OF PHOSPHORIC ACID

[75] Inventors: Rolf Steen Hansen; Ole Hannibal Lie; Henning Reier Nilsen; Thor Sandal, all of Porsgrunn, Norway

[73] Assignee: Norsk Hydro a.s, Oslo, Norway

[21] Appl. No.: 560,089

[22] Filed: Mar. 19, 1975

[30] Foreign Application Priority Data

Mar. 19, 1974 Norway .................................. 740983

[51] Int. Cl.² ........................ C05B 7/00; C05B 11/06; C01B 25/32
[52] U.S. Cl. .......................................... 71/34; 71/39; 71/DIG. 3; 423/167; 423/313; 423/319; 23/273 R; 426/807
[58] Field of Search ............... 71/34, 39, 44, 47, 64 C, 71/DIG. 3; 423/319, 321, 341, 305, 312, 313, 167, 317, 320, 395; 23/259.2, 273 R; 426/635, 807

[56] References Cited

U.S. PATENT DOCUMENTS

| | | | |
|---|---|---|---|
| 2,091,898 | 8/1937 | Weber | 23/273 R |
| 2,689,175 | 9/1954 | Strelzoff et al. | 71/39 |
| 3,002,812 | 10/1961 | Williams | 71/39 |
| 3,099,530 | 7/1963 | Nickerson | 423/167 |
| 3,151,941 | 10/1964 | Hollingsworth et al. | 423/321 |
| 3,195,980 | 7/1965 | Gattiker et al. | 423/319 |
| 3,205,062 | 9/1965 | Gattiker | 71/39 |
| 3,416,889 | 12/1968 | Caldwell | 23/259.2 |
| 3,463,609 | 8/1969 | Garris | 423/320 |
| 3,515,534 | 6/1970 | Livingston | 71/34 |
| 3,528,771 | 9/1970 | Shearon et al. | 423/321 |
| 3,615,195 | 10/1971 | Bierman | 423/320 |
| 3,620,979 | 11/1971 | Corliss | 423/312 |
| 3,802,846 | 4/1974 | Lopker | 23/259.2 |
| 3,939,248 | 2/1976 | Galdwell | 423/167 |

FOREIGN PATENT DOCUMENTS

| | | | |
|---|---|---|---|
| 1,057,643 | 2/1967 | United Kingdom | 423/317 |

OTHER PUBLICATIONS

Waggaman *Phosphoric acid, Phosphates, and Phosphatic Fertilizers*, c. 1927, 1952, pp. 200-209.
Slack, *Phosphoric Acid Part II*, Marcel, Dekker N. Y., 1968, pp. 608-610.

Primary Examiner—Thomas G. Wyse
Assistant Examiner—Ernest G. Therkorn
Attorney, Agent, or Firm—Wenderoth, Lind & Ponack

[57] ABSTRACT

The invention relates to a process for the production of phosphoric acid containing calcium phosphates, i.e. Ca-containing phosphoric acid, by evaporating Ca-containing mother liquor from Odda process, whereby practically all the remaining nitrate and fluorine are removed in the form of $HNO_3$, HF and $SiF_4$, in which process the Ca-containing mother liquor is given a Ca/P weight ratio which is lower than 0.45 and is evaporated while recycling Ca-containing phosphoric acid, the recirculation being so controlled that the liquor has a phosphorus concentration during evaporation which is always adequate to prevent the liquor from forming a paste-like mass. Thus, it was discovered that the undesirable paste-like consistency experienced when calcium is present during evaporation can be avoided by controlling the phosphorus content. More particularly, it was found for most types of rock phosphate that the phosphorus concentration should be below about 15% by weight or above about 22% by weight in order to avoid the formation of a paste-like mass during evaporation of the liquor.

10 Claims, 2 Drawing Figures

PROCESS FOR MANUFACTURING OF PHOSPHORIC ACID

BACKGROUND OF THE INVENTION

This invention relates to a process for manufacturing phosphoric acid, the starting material being the mother liquor from the Odda process after first filtering off the precipitated calcium nitrate tetrahydrate. More particularly this invention relates to a process for manufacturing concentrated phosphoric acid containing calcium phosphates, produced by evaporating Ca-containing mother liquor and thereby removing the nitrate and fluorine present in the mother liquor in the form of nitric acid, hydrofluoric acid and silicon tetrafluoride.

In the Odda process the lime and the phosphoric acid in the phosphate rock are converted to soluble form by nitric acid acidulation of the phosphate rock. The major part of the calcium present is crystallized by cooling in the form of calcium nitrate tetrahydrate, and the crystals are removed from the solution e.g. by means of filtration.

The mother liquor may be further processed in different ways. One way is to make phosphoric acid by removing the nitric acid by evaporation, whereas the residual calcium is precipitated as sulphate and removed. The direct evaporation of the nitrate components and further utilisation of the phosphoric acid-containing residue is a prior known process described in Norwegian Patent No. 50185 (corresponding to U.S. Pat. No. 1,834,455) taken out by Erling Johnson, the inventor of the Odda process. According to this patent the nitric acid in the mother liquor is removed by evaporation, while the calcium residue is precipitated as sulphate. According to the patent, precipitation can be carried out prior to or after removal of the nitric acid by evaporation.

However, due to specific corrosion problems and build-up of deposits in the equipment the process has not been technically feasible. A particular problem has been the removal of the nitric acid when the mother liquor contains substantial amounts of calcium. In spite of the fact that the Odda process has been known for about 40 years, during which time it has been considered to be desirable to establish commercial production of phosphoric acid by this process, these technical problems have been so serious that up to now there has been no suitable technical solution found which is applicable on an industrial scale.

An effort was made in the early 1960's to introduce an industrial process for the manufacture of phosphoric acid based on the Odda process mother liquor. This process is described in the article "Improved route to phosphoric acid" - Chem. Eng. Prog., Vol. 62, No. 2, February, 1966.

The process attempted to solve the specific corrosion, scaling and engineering problems by more extensive removal of calcium and other harmful contaminants from the mother liquor before evaporating the nitrate (nitric acid). The fluorine contaminant was sought to be removed by the addition of finely divided silica ($SiO_2$), and stripping off in the nitric acid acidulation stage, reaction being carried out under boiling, whereby nitric acid-water-$SiF_4$ vapour was formed which was removed from the reaction mixture as it was formed - see U.S. Pat. No. 3,205,062. Further it was also attempted to remove dissolved nitrates by the addition of barium carbonate, the barium nitrate being precipitated and removed from the liquor — see U.S. Pat. No. 3,195,980 — the calcium residue being removed by means of the sulphuric acid addition and precipitation as gypsum. It was not until after the completion of these process stages that final evaporation of the nitric acid was conducted.

However, even this seemingly technically advanced process has not been a success. Use of barium carbonate to precipitate soluble nitrate residue is very costly, and environmental problems arise if sulphuric acid is used for complete removal of the calcium content.

SUMMARY OF THE INVENTION

According to the present invention a new and improved process for the manufacture of phosphoric acid from the Odda process mother liquor has been discovered, which process permits direct evaporation of nitric acid and fluorine without the necessity of removing the remaining calcium. The low fluorine content of the produced calcium-containing phosphoric acid makes it especially suitable as a starting material for the manufacture of calcium-containing animal feed grade phosphates. However, this calcium-containing phosphoric acid can also be advantageously used for the manufacture of triple superphosphate (TSP), PK and other types of fertilizers.

When calcium is present during evaporation in conventional processes, the liquid phase will be gradually converted to an unmanageable paste-like mass. Simultaneously precipitation of calcium phosphate will occur, and deposits will be formed on certain parts of the equipment. Finally the entire production comes to a standstill and the process must be stopped.

It has now been discovered that when the Ca/P weight ratio in the mother liquor is kept below a certain limit, which in the case of most types of rock phosphates will be about 0.45, the paste-like mass will only appear in a relatively limited P-concentration range. Outside this range the liquor is relatively easy-flowing and easy to handle. This is surprising and has not previously been recognized.

According to the invention this knowledge is utilised to realize a new process for the manufacture of phosphoric acid by evaporating calcium-containing Odda process mother liquor and thus directly removing practically all nitrate in the form of nitric acid and all the remaining fluorine in the form of hydrofluoric acid and silica tetrafluoride. The process is characterised in that the Ca-containing mother liquor is given a Ca/P weight ratio lower than 0.45, and is evaporated with recirculation of already evaporated Ca-containing phosphoric acid, the recirculation being so arranged that the mother liquor has a P-concentration during evaporation which is always sufficient to prevent the liquor from forming in a paste-like mass.

With high p-concentrations, scaling of parts of the equipment still presents a problem, and steps must be taken to eliminate such scaling. This can be done by suitable washing of the equipment at regular intervals.

The critical concentration range in which the paste-like mass occurs has been found to be between 15 and 22 wt.% P. As long as the P-concentration is kept below 15 wt.% the mother liquor remains easy-flowing, and there is no scaling. When the P-concentration increases to over 22 wt.% the flow properties are again satisfactory but, as mentioned, there is a tendency to scaling. Here, is also the key to a substantial reduction of the scaling problems. This is according to the invention achieved by means of a special two-stage process.

In accordance with a preferred embodiment of the invention the process is carried out in the form of a two-stage process, the P-concentration in the first stage always being kept below 15 wt.%, while in the second stage it is always kept above 22 wt.%, thus avoiding the critical concentration between 15–22 wt.% P. Scaling on the heating surfaces will occur only in the second stage of the process, and thus it is only in this stage that such deposits must be removed by washing at regular intervals.

In accordance with a further preferred embodiment of the invention, the scaling is removed by changing the sequence of the first and second evaporation stages of the process, so that the mother liquor which goes to the first evaporation stage is used to wash off the scaling formed in the previous second stage. It is somewhat surprising that calcium-containing mother liquor is also able to wash off deposits and clean the equipment. Since the mother liquor is readily available, and in addition automatically returns the deposited material to the process, this is naturally a very advantageous process variant.

BRIEF DESCRIPTION OF THE DRAWINGS

Other objects and essential characteristics of the process according to the invention will be disclosed in the following description wherein the process is described in detail, taken in conjunction with the accompanying drawings wherein.

DETAILED DESCRIPTION OF THE INVENTION

Figure 1:
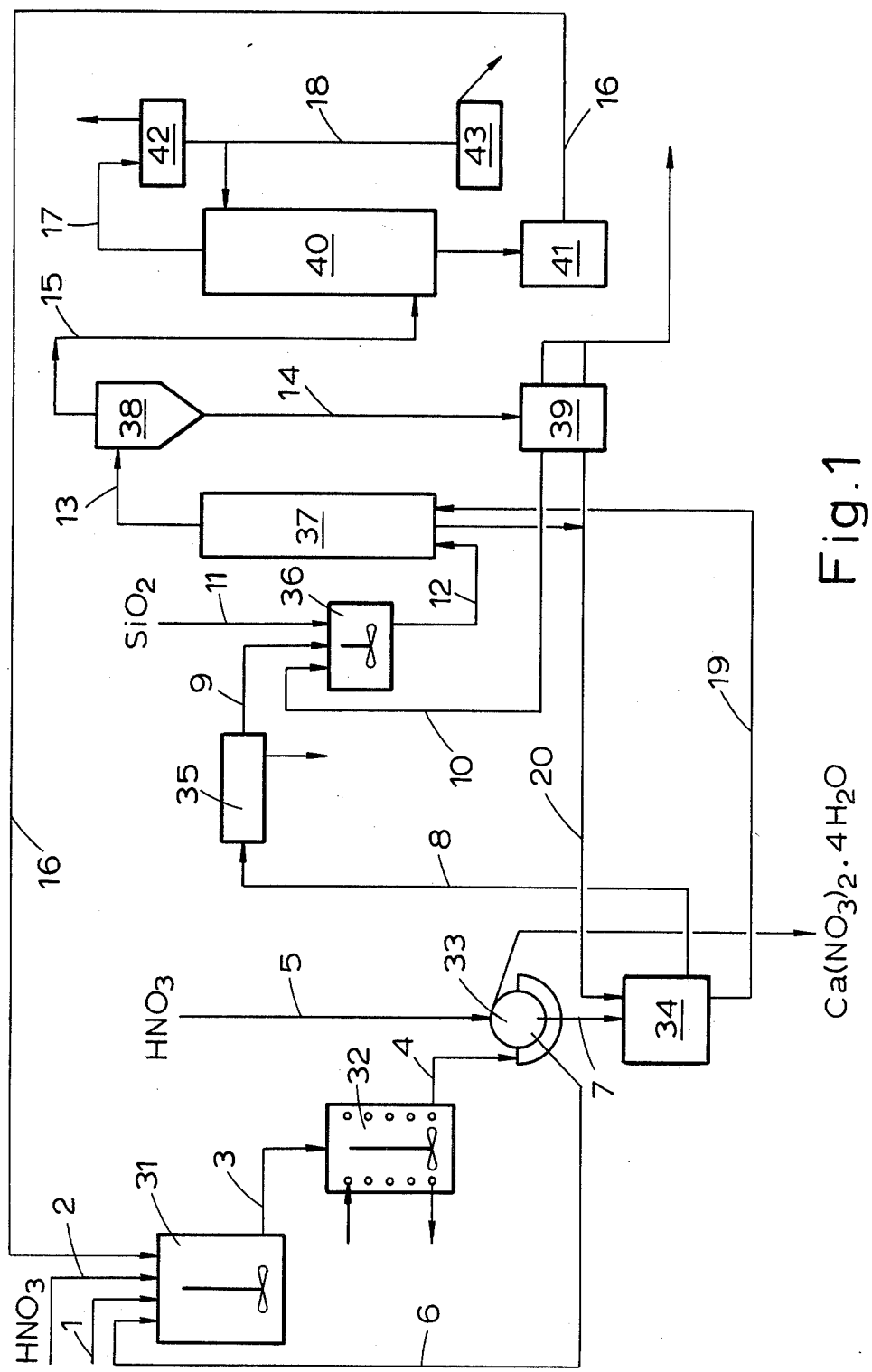
FIGS. 1 and 2 are flow sheets illustrating the process of the invention.

The mother liquor used is produced in a conventional way according to the Odda process by acidulating rock phosphate with at least a stoichiometric amount of 58% nitric acid. Crushed rock phosphate and nitric acid are introduced to the acidulation vessel 31 through lines 1 and 2. The resulting digestion liquor is sent through line 3 to a crystallizer 32 where the major part of the calcium nitrate formed by the acidulation of the rock phosphate, is crystallized as $Ca(NO_3)_2 \cdot 4H_2O$ by cooling. Cooling is continued until the weight ratio between calcium and phosphorus in the mother liquor after removal of the crystals is less than 0.45.

From the crystallizer 32 the crystal slurry is conducted through line 4 to a rotary filter 33 where the $Ca(NO_3)_2 \cdot 4H_2O$ crystals are separated from the mother liquor and washed with nitric acid from line 5, the spent wash acid then being returned to the acidulation vessel 31 through line 6.

From the filter 33 the mother liquor is sent first through line 7 to a buffer tank 34 and thereafter through line 8 to a centrifuge 35, where the major part of the solid fluorine compounds are removed from the mother liquor together with acid-insoluble sludge.

From the centrifuge 35 the mother liquor is sent through line 9 to a mixing vesseel 36 where it is mixed with recirculated product from line 10 and finely divided silica from line 11. The silica may be omitted, depending on the required level of fluorine in the end product. In order to avoid thickening problems during evaporation, the recirculation is kept at a level which ensures over 22 wt.% P in the mixture and preferably in the range 23 – 24 wt.%.

Silica is added to the mother liquor to volatilize the remaining fluorine compounds so that these can be easily removed by evaporation later in the process.

From the mixing vessel 36 the mixture of the three components is sent through line 12 to an evaporator 37, where practically all the water, nitrate and fluorine added with the mother liquor are removed from the liquid phase (as $H_2O$, $HNO_3$, $HF$ and $SiF_4$) by evaporating at a pressure of 50 – 70 mm Hg abs and a temperature of 110° – 120° C. Calcium phosphates are precipitated during this evaporation stage.

The resultant vapour-liquid mixture from the evaporator is sent through line 13 to a separator 38 where the liquid phase, which is now almost a nitrate and fluorine-free mixture of phosphoric acid and precipitated calcium phosphates, Ca-containing phosphoric acid, is withdrawn through a barometric leg 14 and a liquid seal 39. The recycled part of the Ca-containing phosphoric acid is sent from the liquid seal 39 through line 10 to the mixing vessel 36, while the remainder, corresponding to net production, leaves as product.

The vapour phase from the separator 38 is sent through line 15 to a rectifying column 40, where the nitric acid is recovered as 58% acid and is recycled to the acidulation vessel 31 via the liquid seal 41 and line 16. The nitric acid-free vapour from the rectifying column 40 is transferred through line 17 to a condenser 42. The condensate is then sent to the sewerage system via line 18 and the liquid seal 43.

To prevent clogging and to maintain the heat transfer coefficient at an acceptable level it is necessary to wash the evaporator 37 at regular intervals. This is done by first draining the evaporator and then letting mother liquor from the buffer tank 34 flow into it through line 19. After washing the mother liquid is returned to the buffer tank 34 through line 20.

Figure 2:
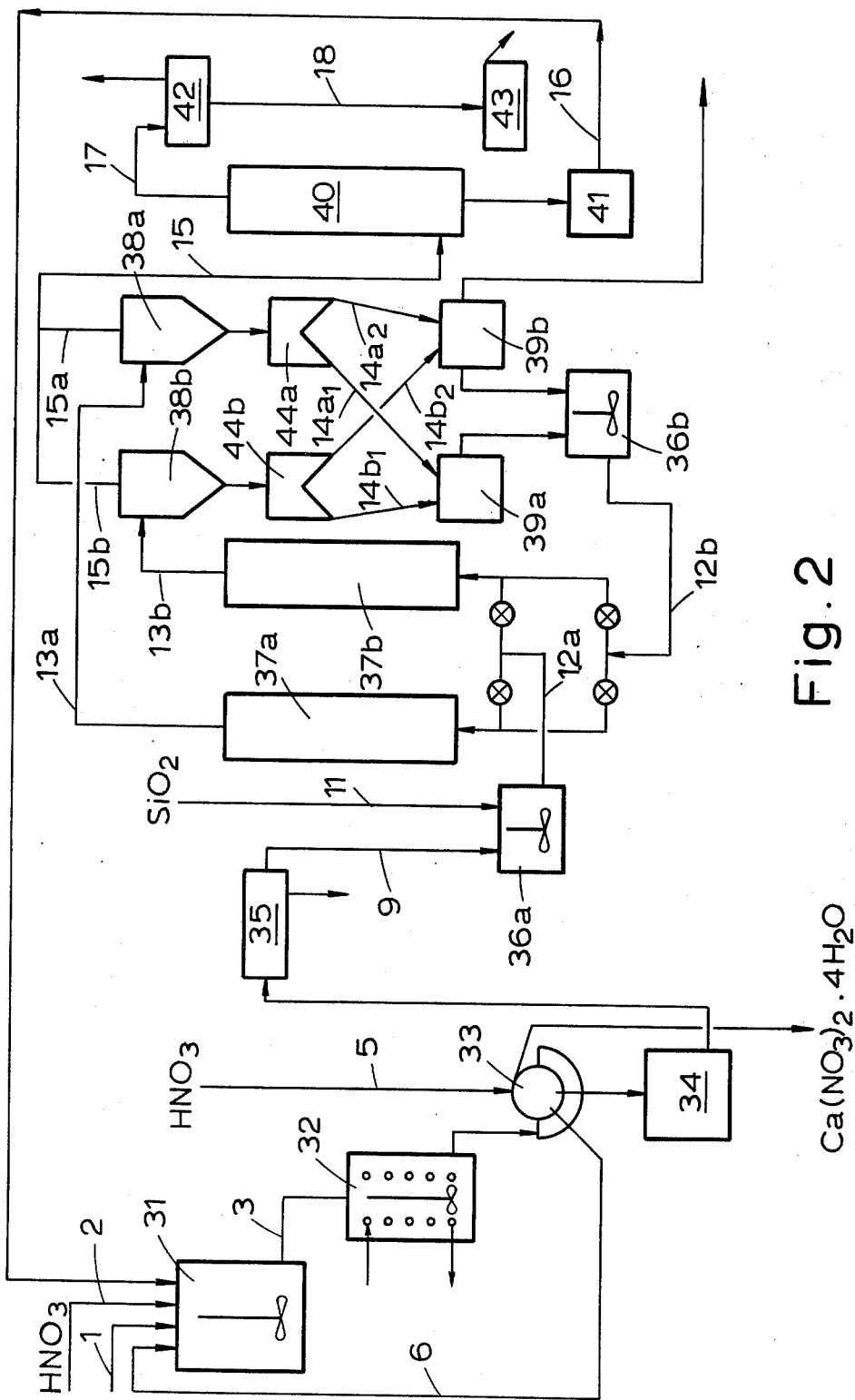

In order to avoid interruption in production as a result of the above mentioned washing, a two-stage evaporating system as shown in FIG. 2 is used in the preferred process. The mother liquor is transferred from the centrifuge 35 through line 9 to a mixing vessel 36a, where, if desired, it is mixed with finely divided silica from line 11. The mother liquor is then conducted through line 12a to one of two evaporators 37a or 37b (stage 1), where the mother liquor is evaporated to 14 – 14.5 wt.% P at a pressure of 50 – 70 mm Hg abs and a temperature of about 70° C. Under these conditions the liquor will dissolve scaling on the heating surfaces.

The vapour-liquid mixture from the evaporator 37a is transferred through line 13a to a separator 38a where the liquid and vapour are separated. The vapour proceeds through line 15a while the liquid phase is tapped via a valve device 44a and a barometric leg $14a_1$ to liquid seal 39a. From there the liquid is transferred to a mixing vessel 36b where it is mixed with an amount of recycled Ca-containing phosphoric acid necessary to ensure a sufficiently high concentration of P in the mixture. From the mixing vessel 36b the mixture is transferred through line 12b to the evaporator 37b (stage 2) where the remaining fluorine, nitrate and water are removed by evaporating at a pressure of 50 – 70 mm Hg abs. and a temperature of 110° – 120° C.

The vapour-liquid mixture from the evaporator 37b is separated in a separator 38b in the same way as employed in stage 1. The liquid phase, in this case Ca-containing phosphoric acid, is tapped via the valve device 44b and the barometric leg $14b_2$ to the liquid seal 39b. From the liquid seal 39b the Ca-containing phosphoric acid to be recycled is transferred to the mixer 36b, while the remainder goes out as product. The vapour from the separators 38a and 38b is combined and sent to the rectifying column 40 through line 15, where the nitric acid in the vapour is recovered and returned to the acidulation vessel 31 as previously described.

When the scaling in the evaporator in stage 2 has reached a given thickness the sequence of the evaporators is reversed, so that evaporator 37a becomes stage 2 and evaporator 37b becomes stage 1, By choosing the right degree of evaporation in stage 1 and a proper time interval between the change of sequence of the evaporators, a continuous, self-cleaning process is achieved.

A further advantage of the preferred two-stage method is that the corrosion rate is reduced because stage 1 proceeds at a considerably lower temperature than stage 2, and because the fluorine content in stage 2 is reduced as compared with a one-stage evaporation.

In principle the evaporation process can be carried out within wide limits of pressures and temperatures, the pressure and temperature being adjusted so that an adequate degree of evaporation is obtained. Due to the simultaneous presence of nitric acid and hydrofluoric acid the corrosion conditions during evaporation are very difficult, however the prior removal of the major part of the fluorine by centrifuging and in addition evaporating at low pressure and temperature reduces the corrosion rate to such a degree that certain types of acid-resisting steel can be used. In one-stage evaporation a pressure of 30 – 150 mm Hg abs, preferably 50 – 70 mm Hg abs, and a temperature in the range of 100° – 150° C, preferably 110° – 120° C, should be employed. The same pressure conditions are employed in the two-stage evaporation operation, while the temperature in the first stage is kept substantially lower and preferably in the range of 65° – 75° C.

Removal of solid fluorine compounds in the mother liquid prior to evaporation is not essential for the process, but will greatly reduce the corrosion rate of the evaporator tubes. At the same time such removal will make it easier to achieve a low enough fluorine content in the product to enable it to be used for the production of animal feed grade phosphates.

Silica is added to the mixer in order to convert the remaining fluorine to a more volatilizable state, e.g. $SiF_4$, which can be easily removed by the later evaporation. The amount of silica necessary to reduce the fluorine content will depend on several factors, i.e. the amount of fluorine required in the product, the type of rock phosphate and the degree of removal of solid fluorine compounds prior to the evaporation, but it will normally be in the range of 0 – 1 wt.% of the mother liquor.

We claim:

1. In a process for the production of phosphoric acid containing calcium phosphates, i.e. Ca-containing phosphoric acid, by evaporating Ca-containing mother liquor from the Odda process and thereby removing substantially all remaining nitrate and fluorine in the form of $HNO_3$, $HF$ and $SiF_4$, the improvement comprising:
   maintaining the Ca/P weight ratio of said Ca-containing mother liquor below 0.45;
   recycling and adding Ca-containing phosphoric acid to said Ca-containing mother liquor to form a liquid mixture which is evaporated; and
   controlling the recycling of said Ca-containing phosphoric acid to maintain a liquid mixture phosphorus concentration during evaporation outside a concentration range of from approximately 15% by weight to approximately 22% by weight, thereby preventing said liquid mixture from becoming pasty.

2. The improvement claimed in claim 1, wherein said phosphorus concentration is above 22% by weight.

3. The improvement claimed in claim 1, wherein evaporation is carried out at a pressure of from 30 – 150 mm Hg abs. and at a temperature of from 100° – 150° C.

4. The improvement claimed in claim 3, wherein evaporation is carried out at a pressure of from 50 – 70 mm Hg abs. and at a temperature of from 110° – 120° C.

5. The improvement claimed in claim 2, wherein evaporation is conducted by means of a two-stage process employing two separate evaporators, the phosphorus concentration in the first stage is maintained below 15% by weight, while the phosphorus concentration in the second stage is maintained above 22% by weight by said recycling of said Ca-containing phosphoric acid.

6. The improvement claimed in claim 5, wherein evaporation is conducted at a pressure of from 30 – 150 mm Hg abs. and at a temperature of from 65° – 75° C. in the first stage and at a temperature of from 100° – 150° C. in the second stage.

7. The improvement claimed in claim 6, wherein evaporation is carried out at a pressure of from 50 – 70 mm Hg abs. and at a second stage temperature of from 110° – 120° C.

8. The improvement claimed in claim 5, wherein after production has continued for a given period the first and second stages of the process are reversed so that scaling produced in the original second stage is removed by now operating such stage as the first stage.

9. The improvement claimed in claim 1, further comprising adding finely divided silica to said mother liquor before evaporation.

10. The improvement claimed in claim 1, further comprising removing the major part of solid fluorine compounds from said mother liquor prior to evaporation.

* * * * *